Figure 1:
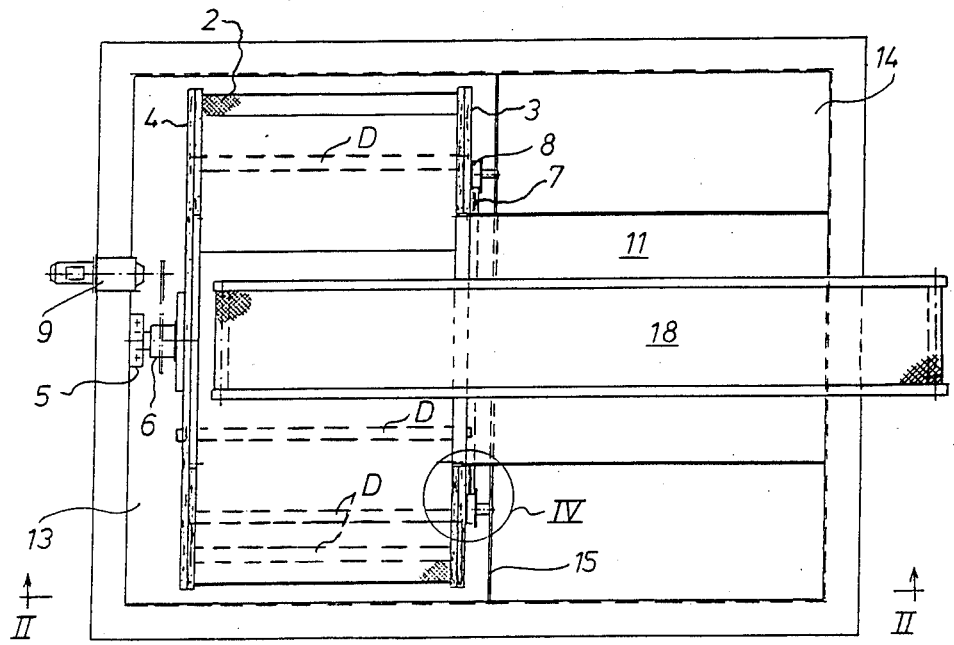

United States Patent [19]

Fröderberg et al.

[11] Patent Number: 4,921,602
[45] Date of Patent: May 1, 1990

[54] FILTER FOR LIQUIDS

[75] Inventors: Ingemar Fröderberg; Per-Oskar Persson, both of Helsingborg, Sweden

[73] Assignee: Ingenjorsfirman Per-Oskar Persson AB, Helsingborg, Sweden

[21] Appl. No.: 375,023
[22] PCT Filed: Dec. 14, 1987
[86] PCT No.: PCT/SE87/00600
    § 371 Date: Jun. 6, 1989
    § 102(e) Date: Jun. 6, 1989
[87] PCT Pub. No.: WO88/04570
    PCT Pub. Date: Jun. 30, 1988

[30] Foreign Application Priority Data

Dec. 15, 1986 [SE] Sweden ............................. 8605380

[51] Int. Cl.⁵ ............................................ B01D 33/18
[52] U.S. Cl. .................................... 210/232; 210/394;
                                                210/493.1; 210/526
[58] Field of Search ............... 210/232, 402, 403, 404,
      210/394, 411, 483, 493.1, 526; 209/257, 270,
                                                403, 687

[56] References Cited

U.S. PATENT DOCUMENTS 1,453,311  2/1920  Engel ............................. 210/394
1,576,374  11/1924 Spanner ......................... 210/394
1,945,492  6/1932  Lamort ........................... 210/403

FOREIGN PATENT DOCUMENTS 2426024  3/1975  Fed. Rep. of Germany .
192024   10/1964 Sweden .
218447   7/1924  United Kingdom .

Primary Examiner—W. Gary Jones
Assistant Examiner—Matthew O. Savage
Attorney, Agent, or Firm—Brooks & Kushman

[57] ABSTRACT

A filter for separating particles from a flow of liquid comprises a filter drum (1) rotatably mounted about a substantially horizontal shaft and partially immersed into the filter liquid. The filter drum comprises a filter cloth (2) forming the circumference of the drum and having a plurality of radially extending sections between two drum end plates (3,4), one (3) of which is provided with a central opening through which the unfiltered liquid enters the interior of the drum. A drive means (9) rotates slowly. A belt conveyor (18) extends over the surface (23) of the liquid flow for removing the particles carried along by the filter cloth out of the liquid and falling down from the filter cloth in an area around the highest point of the drum. The filter cloth side edges formed as beads are clamped in grooves on the inside of the end plates (3,4), and the end plates (3,4) are fixed to each other by means of spacer members (D) spaced from the filter cloth.

10 Claims, 4 Drawing Sheets

U.S. Patent

May 1, 1990

4,921,602

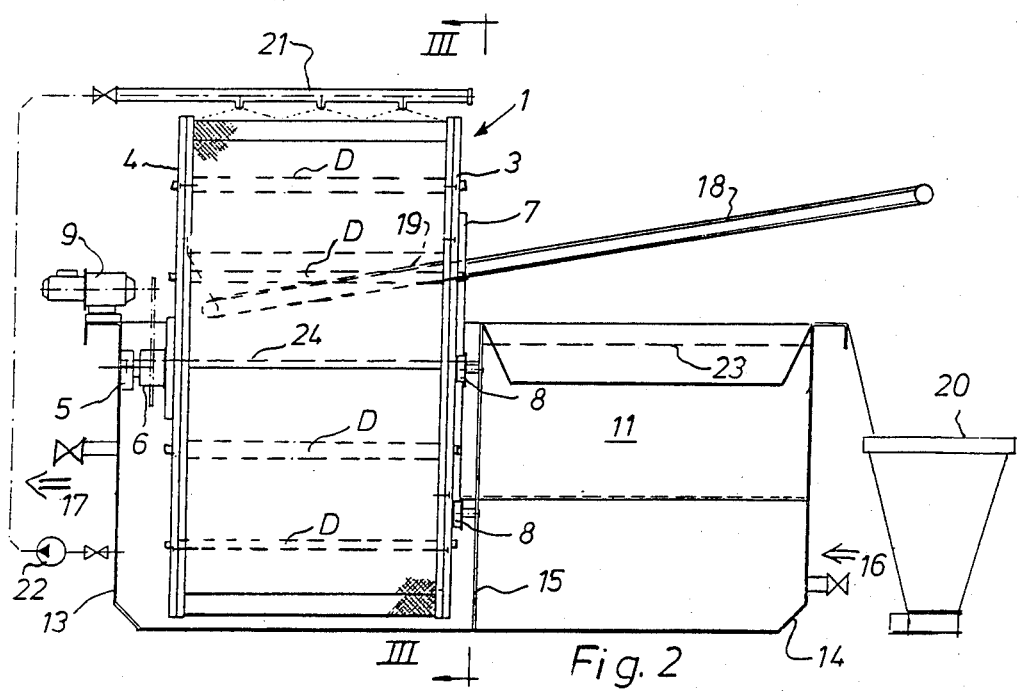
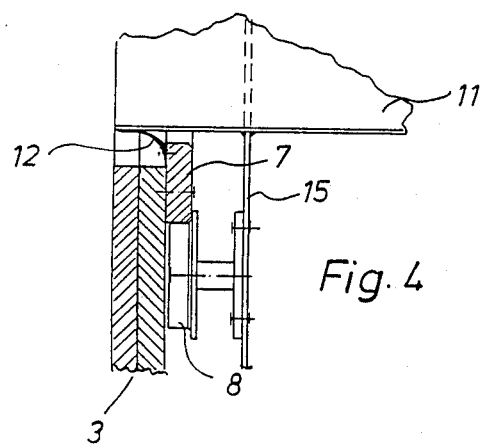

FILTER FOR LIQUIDS

The present invention relates to a filter for separating particles from a flow of liquid. More precisely, the filter is of the type comprising a filter drum rotatably mounted about a substantially horizontal shaft and partially immersed into the filtered liquid, said drum comprising a filter cloth forming the circumference of the drum and having a plurality of radially extending sections positioned between two drum ends plates, one of which is provided with a central opening through which the unfiltered liquid enters the interior of the drum; a drive means for slowly rotating the drum; and a device projecting through the end plate opening into the drum above the surface of the liquid flow and adapted to remove the particles carried along by the filter cloth out of the liquid and falling down from the filter cloth in an area around the highest point of the drum.

A filter of this type known from e.g. U.S. patent specification No. 1,945,492 is convenient since it is suited for separating particles from a liquid which are present in a relatively low concentration and must be treated carefully so as not to be dissolved in the liquid.

Up to date, there have, however, been rather few developments of the technique, meaning that a direct application thereof would bring considerable drawbacks in several respects. Thus, the filter cloth in the prior art drums is retained by crossbars, which results in operational drawbacks since dirt pockets are formed around these bars. Such mounting of the cloth also means that the exchange of cloth is time-consuming and normally requires joining of the cloth when positioned in the drum. This prior art mounting of the filter cloth is also not ideal in view of strength, since it is difficult to obtain a uniform stress distribution.

The first object of the present invention therefore is to provide a filter of the type mentioned by way of introduction, which eliminates the above drawbacks of the prior art designs.

According to the invention, this is achieved in that the filter is characterized in that the side edges of the filter cloth are clamped in grooves on the inside of the end plates, and that the end plates are fixed to each other by means of spacer members spaced from the filter cloth. This inventive clamping results in uniform traction along the entire length of the cloth, which makes the stress on the cloth comparatively low, even if the spacer members between the end plates keep the end plates apart by comparatively great force. Further, the dirt pockets in prior art filters, both around the crossbars and where the cloth connects with the end plates, are eliminated. The clamping of the filter cloth also establishes a perfect seal between the cloth and the end plates.

High efficiency in a filter of the type described above requires not only that the particles to be separated are treated carefully, but also that they are removed from the liquid as quickly as possible, such that any components included in the particles and soluble in the liquid do not have time to be dissolved to a larger extent than necessary.

The second object of the invention therefore is to provide a filter as described above, having a high filtering capacity.

According to the invention, this object is achieved in that each radially extending section is shaped so that, during its movement out of the liquid, its last portion leaving the liquid is a portion spaced from the radially inner limit of said section.

By this design, a certain amount of liquid is confined to each radially extending, pocket-like section and is carried along by this pocket out of the liquid. On the way up to the highest point of the drum, a dewatering occurs, and the particles separated remain on the inside of the filter cloth, until they reach the vicinity of the highest point of the drum. This results in a highly efficient separation of particles which are swimming on or close to the surface of the unfiltered liquid flowing into the drum.

To further increase the degree of separation, a tangential elevation, such as a bead, can be arranged tangentially from the axial line of the lower part of the radially extending section of the filter cloth, which line first penetrates the liquid surface. Alternatively, a cloth-supporting crossbar can be arranged radially slightly outside said axial line on the cloth outside.

In a preferred embodiment, the filter cloth is formed with beads of an elastic material along its side edges. This facilitates the clamping in the grooves of the end plates and, thus, the sealing between the filter cloth and the end plates. Moreover, a uniform distribution of the traction in the cloth is ensured over the entire cloth surface. To facilitate the mounting of the endless filter cloth, the side beads are preferably provided with guide means; one or two for each radially extending section. These guide means correspond to the clamping grooves in the end plates.

The inventive design allows per se the utilisation of quite thin filter cloths with extremely small mesh apertures, for example close on 100 $\mu$m, and may be elastic. Filter cloths with still smaller mesh apertures, for example close on 10 $\mu$m, may also be used in the filter according to the invention, particularly if they are manufactured with axial reinforcements included in the cloth, whereby the filtering parts of the cloth need not on their own resist the stress between the end plates. The cloth can also be provided with reinforcements in other directions and to such an extent that the free filter surfaces are not larger than to allow the strength of the cloth to resist any stress that may arise.

The high capacity of the inventive filter is also promoted by the fact that the removing device conveniently is a conveyor permeable to the liquid, preferably a belt conveyor. Thus, the liquid can flow away from the particles separated also during the discharge thereof from the interior of the drum to a collecting vessel.

To ensure that the particles caught on the inside of the filter cloth actually fall down onto the removing device, the filter can, in per se known manner, comprise a washing device arranged above the highest point of the drum. The filtered liquid is supplied to the washing device preferably intermittently by means of a pump.

Figure 3:
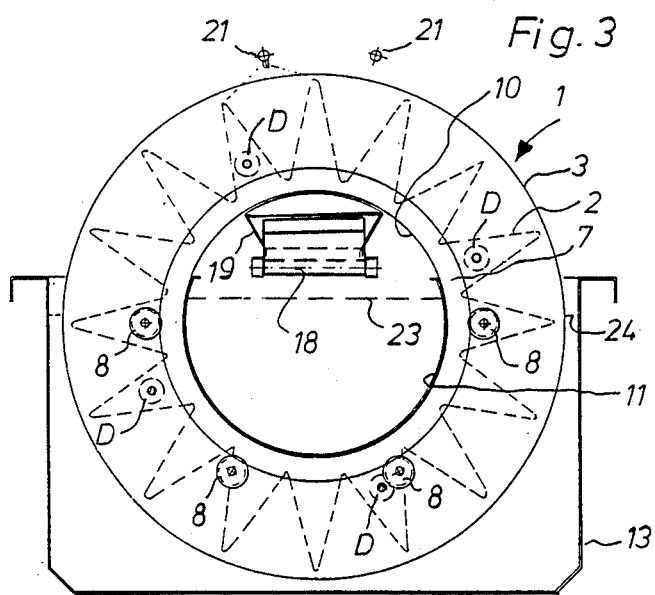
Figure 5:
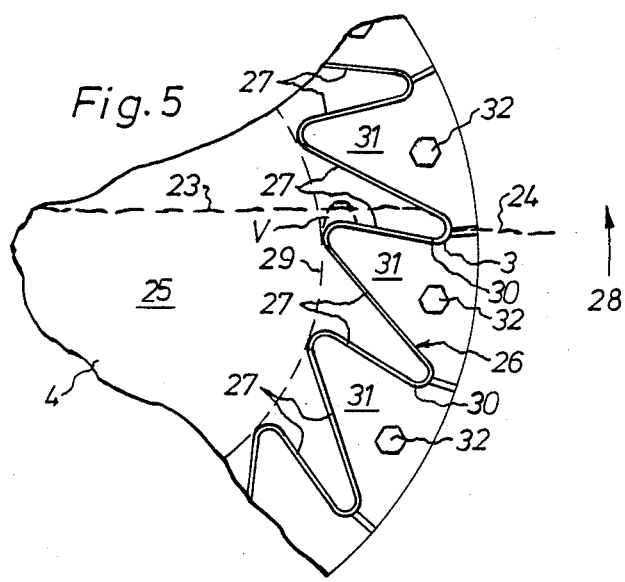
Figure 6:
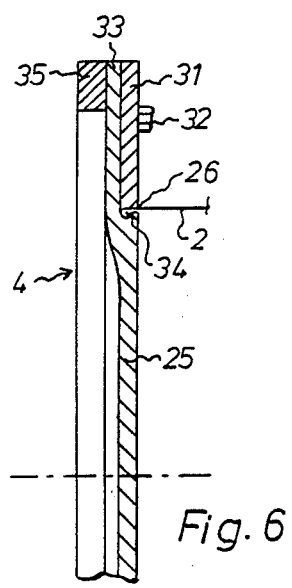
Figure 7:
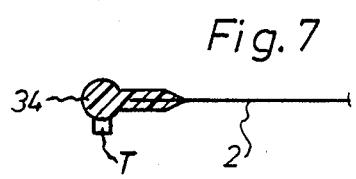
Figure 8:
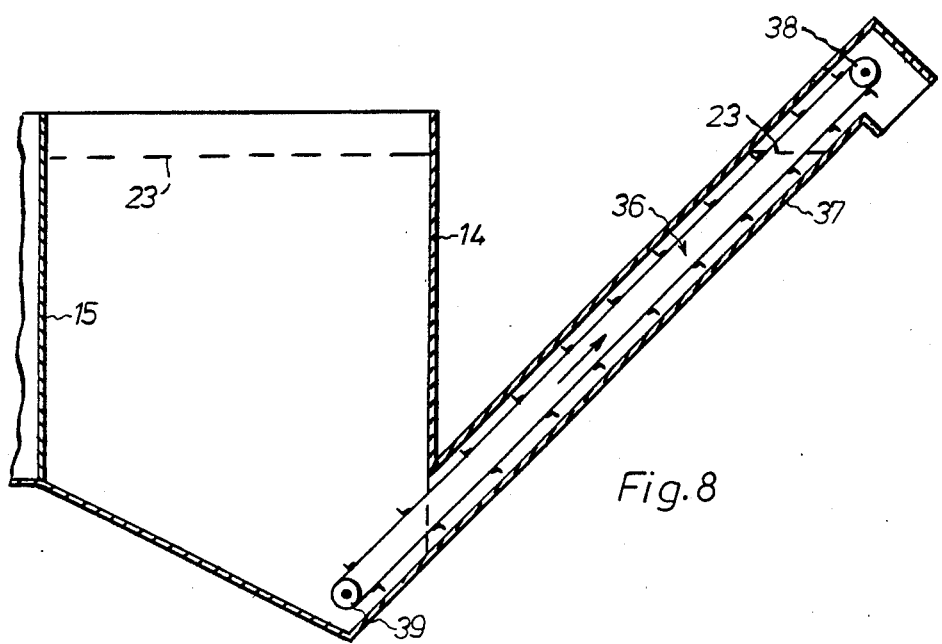

The invention will now be described in detail below, reference being had to the accompanying drawings in which FIG. 1 is a plan view of a filter according to an embodiment of the present invention, FIG. 2 is a longitudinal view along line II—II in FIG. 1, FIG. 3 is a cross-section along line III—III in FIG. 2, FIG. 4 is a view of a detail which in FIG. 1 is designated IV, FIG. 5 illustrates a part of a preferred embodiment of the end plates included in the filter, FIG. 6 shows a preferred embodiment of the mounting of the filter drum included in the filter, FIG. 7 is a cross-section of the side edge of a filter cloth according to the invention, and FIG. 8 shows a scrape elevator to be used in the filter.

The filter according to the invention shown in FIGS. 1–4 comprises a drum 1 having a filter cloth 2 which in star-shape is arranged around the drum center been two circular end plates 3, 4. The end plates 3, 4 are fixed to each other by means of a plurality of rod-shaped axial spacer members D which do not touch the filter cloth 2 but are spaced therefrom. The drum 1 is rotatably mounted by means of a bearing 5 which receives a journal 6 projecting from the center of the end plate 4, and a ring 7 mounted on the outside of the end plate 3 and forming an axial tread engaging with four supporting rollers 8. A motor 9 drives the drum 1 to slowly rotate via a chain cooperating with the journal 6. In the end plate 3, a central opening 10 is formed inside the ring 7.

An inlet channel 11 axially directed to the drum 1 connects with the opening 10 in the end plate 3, the gap between the opening 10 and the terminal edge of the channel 11 being sealed by means of a strip seal 12.

More than half of the drum is immersed into an outlet box 13 separated from an inlet box 14 by a partition 15 through which the channel 11 extends. The inlet box 14 is provided with an inlet 16, and the outlet box 13 with an outlet 17.

A belt conveyor 18 is mounted above the inlet box 14 and extends through the opening 10 in the end plate 3 and over the inlet channel 11 to the vicinity of the end plate 4. Above the belt conveyor portion inside the drum 1, there is mounted an upwardly flared funnel 19. The outer end of the conveyor 18 is positioned above a collecting vessel 20. The belt of the belt conveyor 18 is perforated so as to be permeable to the liquid to be filtered. Furthermore, the belt conveyor 18 is preferably inclined upwardly as seen from its end inside the drum 1 towards its outer end adjacent the vessel 20. Its belt may then be provided with transverse elevations carrying along particles which have fallen down on the belt, to the vessel 20, while the liquid is allowed to pass through the belt.

For the washing of the filter cloth 2, a washing device 21 is arranged in a position above the highest point of the drum 1 and provided with a plurality of flushing nozzles. The washing device 20 is intermittently supplied with liquid from the outlet box 13 by means of a pump 22.

During operation, the liquid levels in the inlet box 14 and the outlet box 13 correspond approximately to those indicated by dashed lines 23 and 24 in FIGS. 2 and 3. There is thus a minor difference in level between the inlet box 14 and the outlet box 13, and because of this difference, the liquid flows from the interior of the drum through the filter cloth 2 to the outlet box 13.

When, during the operation, the drum 1 rotates slowly and evenly, particles in the unfiltered liquid inside the drum 1 will get caught on the inside of the filter cloth 2 and be carried along by the filter cloth 2 out of the liquid. The accompanying liquid rapidly flows away from the filter cloth, whereas the particles caught are carried along by the filter cloth up to the highest point of the drum where a large portion of particles are caused by gravity to release the filter cloth and fall down through the funnel 19 onto the conveyor belt 18. The particles are conveyed by the conveyor belt 18, during continued separation of any residual liquid, out to the collecting vessel 20 and are dropped down into the same. This may require a special device, e.g. a scraper or a compressed air nozzle, at the outer end of the conveyor belt 18 to make the particles release the belt.

In some cases, the particles caught on the filter cloth can be allowed to form a layer thereon so as to improve the filtering effect of the filter cloth. To reduce the thickness of the gradually built-up particle layer, a constantly occurring cleaning is required which is carried out by means of the gradually built-up particle nozzles spray filter liquid against the outside of the filter cloth and thus wash down the particles caught on the inside of the filter cloth through the funnel 19 and onto the conveyor belt 18.

The inventive clamping of the filter cloth 2 to the end plates 3, 4 is shown in FIGS. 5 and 6. FIG. 5 shows a part of the inside of the end plate 4. FIG. 6 is a radial cross-section of the same end plate 4. More precisely, the end plate 4 comprises a disc 25 in whose side facing the interior of the drum 1 there is formed a groove 26. The groove 26, which in the embodiment shown in FIGS. 1–4 is star-shaped, is according to the preferred embodiment as shown in FIG. 5 divided into a plurality of radially extending sections 27 which are formed such that, when moving in the direction of arrow 28 out of the liquid, the last portion of each radially extending section to leave the liquid is a portion 30 spaced from the radially inner limit 29 of said section. The sections 27 are thus pocket-like, and each will carry along a certain amount of liquid up from the liquid surface 23 in the inlet box 14. Consequently, the amount of particles separated during each revolution of the drum 1 is substantially increased. To further increase the degree of separation, an elevation may be provided, e.g. in the form of a bead V indicated by dashed lines and extending axially along a line on the filter cloth 2. Upon penetration of the liquid surface, this line forms said pocket.

As is shown in FIGS. 5 and 6, the groove 26 is formed between an outwardly facing surface of the disc 25, which follows the shape of the sections 27, and the complementary inwardly facing surface of a number, corresponding to the number of sections 27, of clamping pieces 31 which are, by means of bolts 32, screwable in the rim portion 33 of the disc 25.

As shown in FIG. 6 and still better in FIG. 7, the side edge of the filter cloth has, according to the invention, been provided with a bead 34 of an elastic material. This bead may preferably consist of rubber and be attached by vulcanisation on both sides of the edge of the filter cloth 2. It will be appreciated that the inventive clamping of the filter cloth 2 to the end plates 3, 4 provides a perfectly sealed connection which collects no dirt and further evenly distributes the traction on the filter cloth over the entire length thereof. The mounting of the filter cloth is facilitated by guide means in the form of e.g. radially inwardly extending pins T arranged on the bead 34, and corresponding recesses in the clamping grooves 26 of the end plates 3, 4.

The groove 26 on the inside of the end plates 3, 4 can, of course, be designed in a manner other than shown in FIGS. 5 and 6.

According to the preferred embodiment of the invention, the drum 1 is mounted on rollers above the liquid surface 24. This can be provided in that the outside of the end plates 3, 4 is equipped with an axial flange, such as the flange 35 on the end plate 4 in FIG. 6. Thus, each end plate 3, 4 can be supported by two or, preferably, three supporting rollers disposed above the liquid surface 24 and engaging with the inside of the flange 35. The flange 35 on the end plate 4 can be designed as a chain or gear rim or the like, whereby the drum 1 can also be driven by the motor 9 via a supporting roller for the flange 35, which is designed as a gear wheel. Most advantageously, the driving can, however, be carried out by means of a driving roller which frictionally engages with the circumference of one of the end plates 3, 4. In this case the circumference is preferably a rubber surface, for example in that a U-shaped rubber section is arranged around the end plate.

Alternatively, the flange 35 can be replaced by a ring which is supported by the spacer members D spaced from the end plates 3, 4. This ring is also mounted on supporting rollers, and its outer circumference may be shaped as a gear rim to be driven by the motor 9.

The liquid to be filtered enters the inlet box 14 via the inlet 16 and flows into the inlet channel 11 over an upper edge thereof, which in the inlet box is, at least partly, located under the liquid level 23 in the inlet box. Relatively heavy particles carried along by the liquid through the inlet 16, are settled on the bottom of the inlet box 14 and thus do not charge the filter. The sediment can be removed via a bottom valve in the inlet box 14 or by means of a scraper elevator as schematically shown in FIG. 8.

The scraper elevator 36 as shown in FIG. 8 extends through a cross-sectionally rectangular tube 37 and comprises an upper guide roller 38 at the open upper end of the tube 37 above the liquid level 23 in the inlet box 14, and a lower guide roller 39 at the inlet case bottom sloping towards the guide roller 39. Normally, the scraper elevator 36 operates intermittently and is started, when a sufficiently thick layer of sediment has been formed on the inlet box bottom.

The filter described above is useful in a great many fields. One example is the separation of faeces from the water of a fish breeding station. Another example is the separation of solid particles from the waste water in the vegetable industry. Further examples are the continuous separation of algae from water and several conceivable applications in connection with waste water treatment plants.

Because of this inventive clamping of the filter cloth to the end plates, filter cloths of relatively low strength can thus be used. Consequently, use can be made of filter cloths with an extremely small mesh aperture. Optionally, the filter cloth can be provided with reinforcements extending axially and/or circumferentially and is suitably made of an elastic material, which facilitates assembly upon exchange of the filter cloth.

Finally, the filter need not be combined with the inlet and outlet boxes, but can also be positioned directly in a liquid duct provided with a partition corresponding to the partition 15.

We claim:

1. A filter for separating particles from a flow of liquid, comprising a filter drum (1) rotatably mounted about a substantially horizontal shaft and partially immersed into filtered liquid, said drum comprising a filter cloth (2) forming the circumference of said drum and having a plurality of radially extending sections (27) positioned between two drum end plates (3, 4), one of said end plates (3) is provided with a central opening (10) through which the unfiltered liquid enters the interior of said drum; a drive means (9) for slowly rotating said drum; and a device (18) projecting through said one end plate opening into said drum above a surface (23) of the filtered liquid for removing particles carried along by the filter cloth out of the liquid and falling down from said filter cloth in an area around the highest point of said drum, wherein side edges of said filter cloth (2) are clamped in grooves (26) formed on the inside of said end plates (3, 4), and said end plates (3, 4) are fixed to each other by means of spacer members (D) spaced inwardly from said filter cloth.

2. A filter as claimed in claim 1, wherein the side edges of said filter cloth (2) are shaped as beads (34) of an elastic material, and having a plurality of guide means (T) distributed along said side edges.

3. A filter as claimed in claim 2, wherein said bead (34) is a rubber section attached by vulcanisation to said filter cloth (2).

4. A filter as claimed in any one of claims 1-3, wherein said filter cloth (2) is provided with reinforcements extending axially and/or circumferentially.

5. A filter as claimed in any one of claims 1-3, wherein said cloth (2) is elastic.

6. A filter as claimed in any one of claims 1-3, wherein each radially extending section (27) is shaped such that, during its movement (28) out of the liquid, its last portion leaving the liquid is a portion spaced from the radially inner limit (29) of said section.

7. A filter as claimed in any one of claims 1-3, wherein said device (18) is a conveyor permeable to the liquid.

8. A filter as claimed in any one of claims 1-3, wherein said drum (2) is rotatably mounted on bearings positioned above the surface of said filtered liquid.

9. A filter as claimed in any one of claims 1-3, further comprising a washing device (21) arranged above the highest point of said drum (2), and a pump (25) for intermittently supplying filtered liquid to said washing device.

10. A filter as claimed in any one of claims 1-3, further comprising a scraper elevator (36) for discharging material settled from the liquid in an inlet box (14) through which said liquid flows to said central opening (10).

* * * * *

UNITED STATES PATENT AND TRADEMARK OFFICE
CERTIFICATE OF CORRECTION

PATENT NO. : 4,921,602

DATED : May 1, 1990

INVENTOR(S) : Ingemar Froderberg

It is certified that error appears in the above-identified patent and that said Letters Patent is hereby corrected as shown below:

Column 1, line 11, after
"drum" and before "plates,", "ends" should be --end--; and Column 4, line 12,
"out by means of the gradually built up particle nozzles" should read --out by means of the washing device 21 whose nozzles--.

Signed and Sealed this

Seventeenth Day of March, 1992

Attest:

HARRY F. MANBECK, JR.

*Attesting Officer*      *Commissioner of Patents and Trademarks*